(No Model.) 2 Sheets—Sheet 1.

F. W. KOEHLER & F. W. MARTEN.
EXPRESS CAR ATTACHMENT.

No. 525,713. Patented Sept. 11, 1894.

Witnesses
Walter Wagner
Chas. Rust.

Inventors
Fred W. Koehler.
Fred W. Marten.
By their Attorney
Wm Zimmerman.

(No Model.) 2 Sheets—Sheet 2.

F. W. KOEHLER & F. W. MARTEN.
EXPRESS CAR ATTACHMENT.

No. 525,713. Patented Sept. 11, 1894.

Witnesses
Walter Wagner
Chas. Rust.

Inventors
Fred W. Koehler
Fred W. Marten
By their Attorney W. Zimmerman.

UNITED STATES PATENT OFFICE.

FRED W. KOEHLER AND FRED. W. MARTEN, OF CHICAGO, ILLINOIS.

EXPRESS-CAR ATTACHMENT.

SPECIFICATION forming part of Letters Patent No. 525,713, dated September 11, 1894.

Application filed April 3, 1894. Serial No. 506,143. (No model.)

*To all whom it may concern:*

Be it known that we, FRED W. KOEHLER and FRED. W. MARTEN, citizens of the United States, residing at Chicago, in the county of Cook and State of Illinois, have invented certain new and useful Improvements in Express-Car Attachments, which are fully set forth in the following specification, reference being had to the accompanying drawings, forming a part hereof, and in which—

Figure 1:
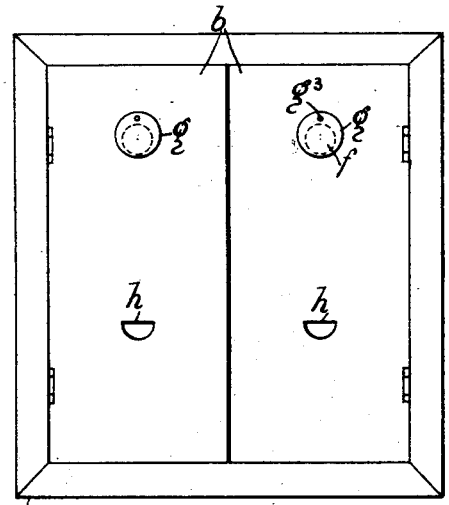
Figure 2:
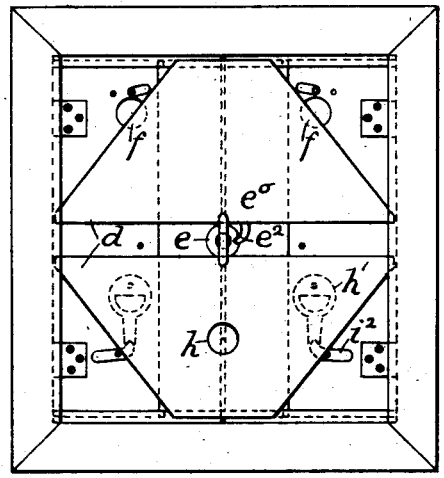
Figure 3:
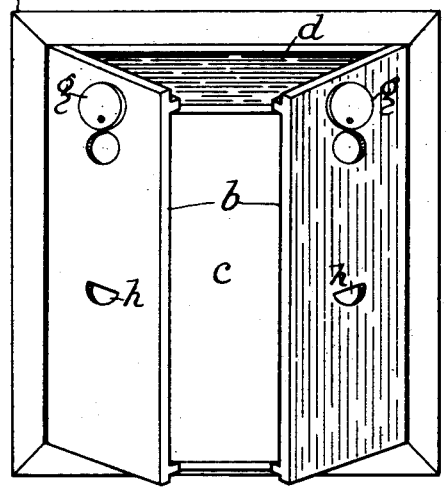
Figure 4:
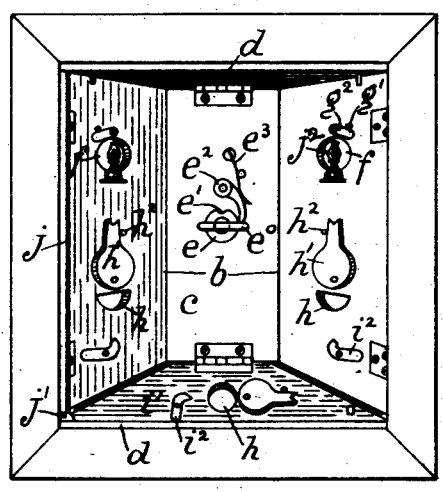
Figure 5:
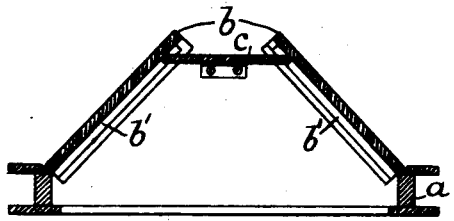
Figure 6:
Figure 7:
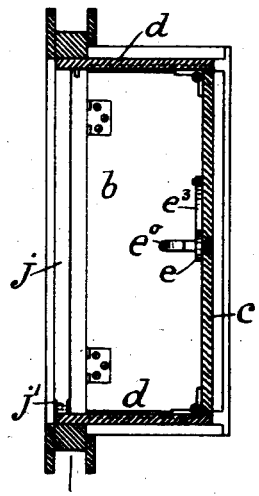
Figures 9, 10:
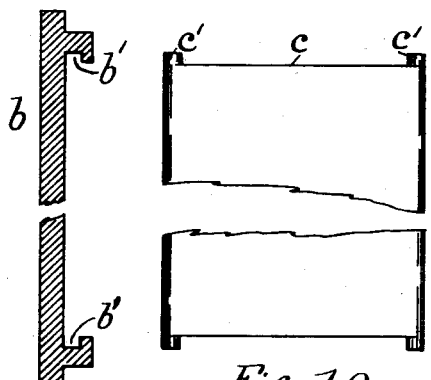
Figure 8:
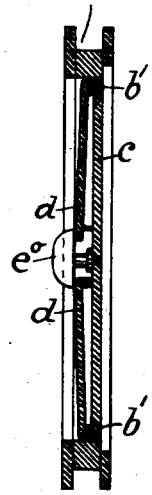
Figure 11:
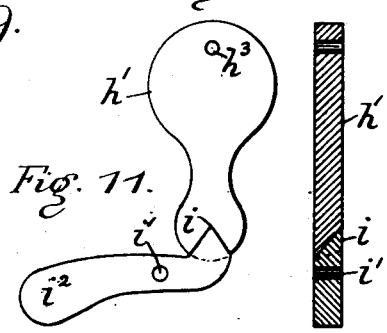
Figure 12:
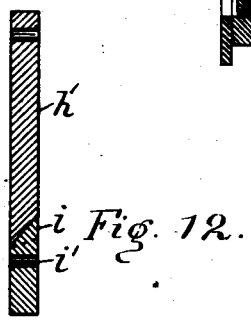

Figure 1 shows our said car attachment in exterior side view, closed. Fig. 2 shows the same in interior view, closed. Fig. 3 shows Fig. 1 open in exterior view. Fig. 4 shows Fig. 3 in interior view. Fig. 5 shows a horizontal section of Fig. 3, near its center. Fig. 6 shows a horizontal section of Fig. 1 near its center. Fig. 7 shows a vertical section of Fig. 3 near its center. Fig. 8 shows a longitudinal section of Fig. 1 near its center. Fig. 9 shows a vertical section of one of the shutters, the central part broken out. Fig. 10 shows a vertical portion of the part between the shutters its central portion being broken away. Fig. 11 shows a cover and lock for the holes shown in Figs. 2 and 4, in front elevation. Fig. 12 shows a central longitudinal section of Fig. 11.

Like letters refer to like parts.

The object of our invention is to provide an expansible and collapsible attachment to a car-wall, and like places, resembling a bay window, with its advantages, in affording safe means of defense and attack against train robbers, and to attain said desirable ends we construct our said device in substantially the following manner, namely: We make a casing and frame, $a$, similar to that of a window, or door, and set it into the wall of an express-car. To this frame are hinged two shutters, $b$, having across their interior inner ends cleats with channels, $b'$, with stops at their outer ends, in which move pins, or trunnions, $c'$, at the four corners of a part, $c$, which forms the third wall of said structure, the two blinds, $b$, forming the two other sides. To the upper and lower ends of said central wall, $c$, are hinged the top and bottom parts, $d$, of said structure, and in the bottom and sides thereof are holes, $h$, with shutters, $h'$, hinging on pins, $h^3$. Said pins being in the upper end of said shutter, and free to turn, will allow said shutters to close the holes by gravity. In the lower end of said shutters, $h'$, is a triangular and beveled notch into which fits the point, $i$, of a lever fulcrumed at $i'$. The weight, $i^2$, which forms the free end of said lever holds the point in said notch. In the upper part of said structure are holes, $f$, for lamps or lanterns, $f^2$, supported in any well known way, and on the outer side of the structure are shutters, $g$, which, with interior levers, or handles, $g^2$, are fixed to shafts, $g^3$, turning in the wall. A pin, $g'$, forms a stop for the lever, $g^2$, which is placed into such a relative position with the shutter, $g$, that the weight of the latter will hold the lever to the said stop and thus keep the shutter open. Said shutters are shown closed in Figs. 1 and 2, and open in Figs. 3 and 4. The upper end of our structure must be raised to its place where it is held by a brace, $j$, hinged at $j'$. The lower end, or bottom, takes its place by gravity.

In the center of the wall, $c$, is a button, $e^0$, with a collar, $e$, having a notch, $e'$, into which fits the end of a pawl, $e^2$, held down by a spring, $e^3$. The parts, $e^0$, $e'$, move with each other fixedly. Said button, and its connected parts, are shown in the locked position in Fig. 2, and in their open position in Fig. 4. By turning said button into said latter position and pressing it outward as far as the wall, $c$, will move all the parts, which constitute the walls, or shell of said structure, will move to their respective places in the open position except the upper end which must be lifted thereto by hand and held therein by some suitable locking device. When thus opened the lanterns, if needed, are placed in their places and the shutters, closing those holes, opened. The shutters, $h'$, are opened to see proceedings outside and for the use of firearms through them. To close this device it is only necessary to release the upper part, $d$, and to lift the inner edge of the bottom and at the same time pull in the button, $e^0$. This will quickly fold the structure and place its respective parts as shown in Figs. 1, 2, 6 and 8. It is, of course, understood that this structure should be made of some bullet-proof material, as sheet steel, and obvious that the device will be abundantly large when its area covers from four to six square feet; that it is easily, quickly, and cheaply attached to any car and that it is operated with great rapidity and perfect safety.

What we claim is—

1. The combination with a car-body with side openings provided with vertical hinged walls with channels, of an intermediate wall secured and movable in said channels and thereto connected end pieces, to operate, substantially as specified.

2. The combination with a car-body with side openings provided with vertically hinged walls with channels, of an intermediate wall secured and movable in said channels and thereto connected end-pieces, said walls and ends provided with openings, substantially as specified.

3. The combination with a car-body with side openings provided with vertically hinged walls with channels, of an intermediate wall secured and movable in said channels and thereto connected end-pieces, said walls and ends provided with openings with shutters and the upper end piece with a hinged brace substantially as specified.

FRED W. KOEHLER.
FRED. W. MARTEN.

Witnesses:
WM. ZIMMERMAN,
A. BURTON STRATTON.